Dec. 26, 1967   M. M. BECKA ETAL   3,359,584
TOE PULLING OVER AND LASTING MACHINE WITH VAMP GAUGE
Filed May 10, 1966   14 Sheets-Sheet 1

INVENTORS
Michael M. Becka
Allen C. Harriman

BY Albert Gordon
ATT'Y

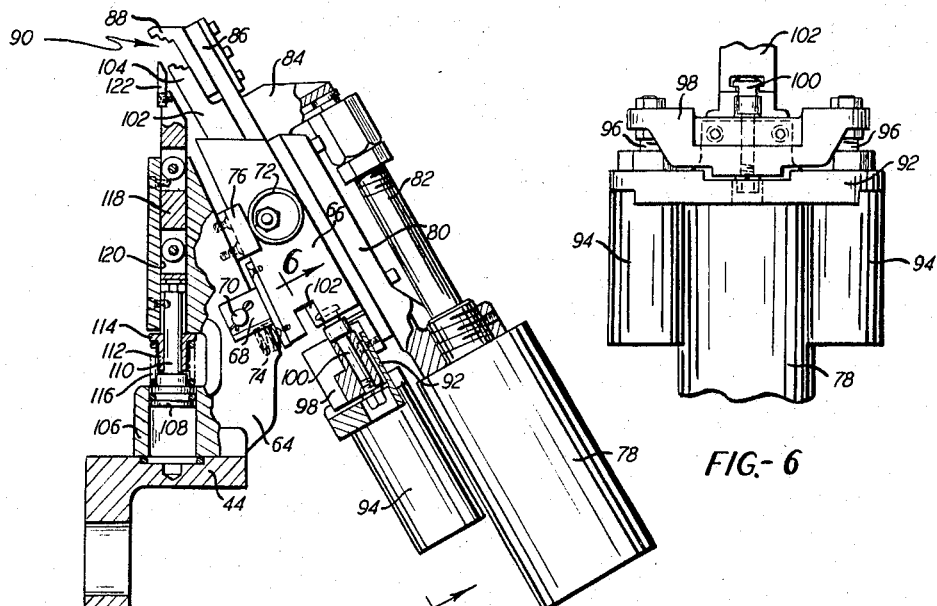
FIG.-5
FIG.-6
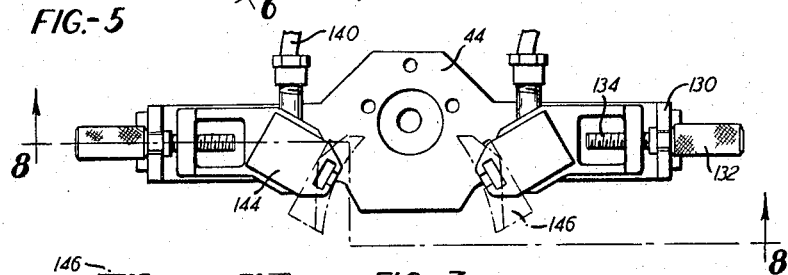
FIG.-7
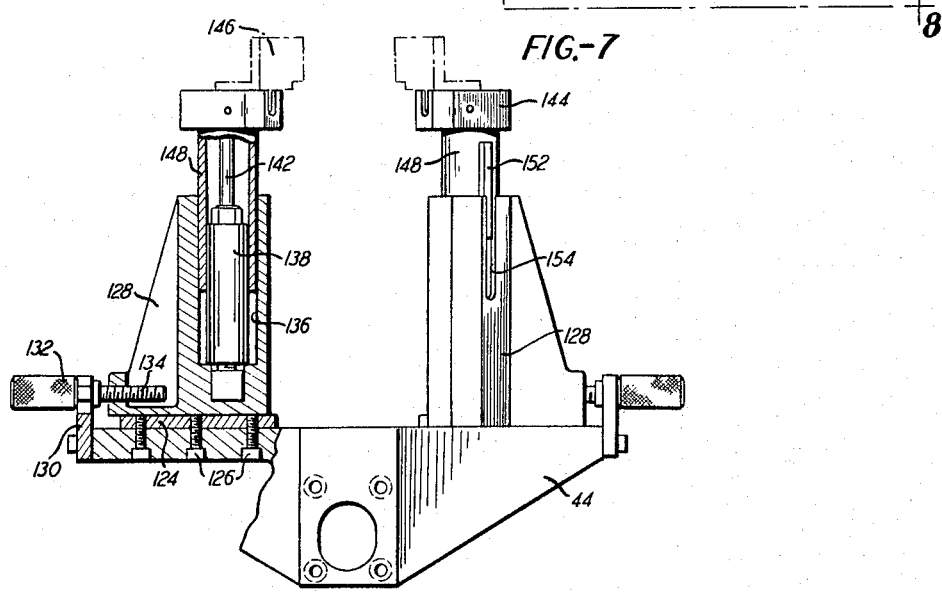
FIG.-8

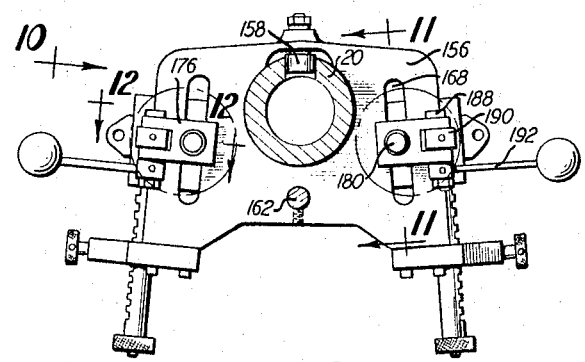
FIG.-9
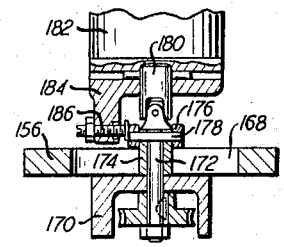
FIG.-11
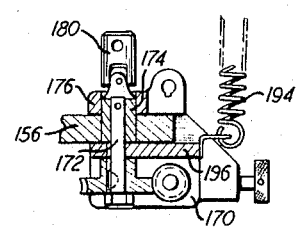
FIG.-12
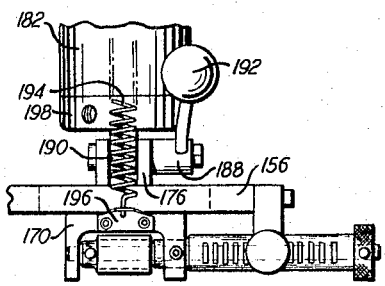
FIG.-10
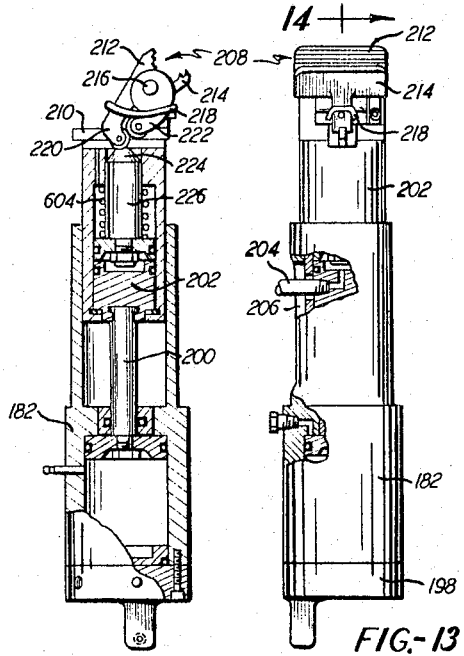
FIG.-13
FIG.-14

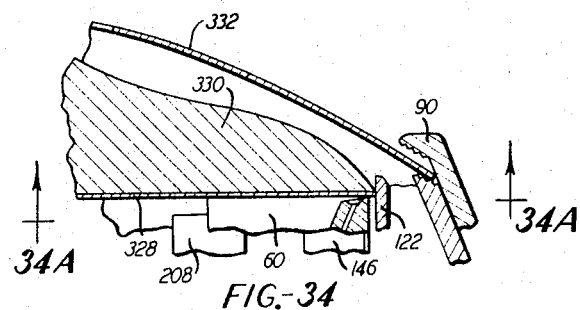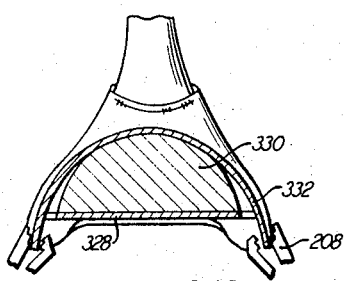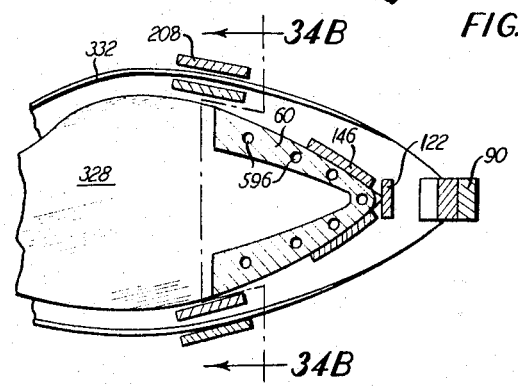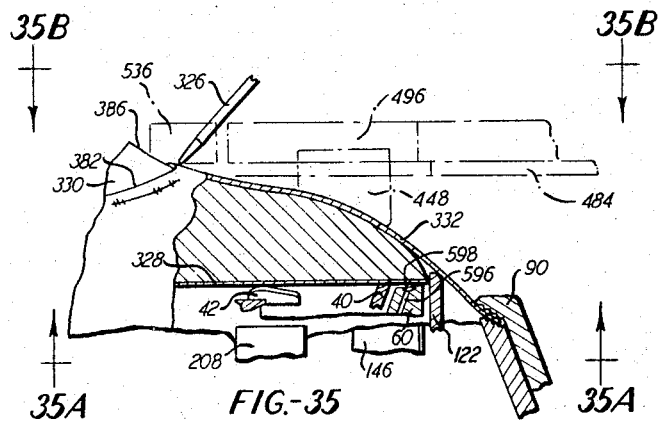

United States Patent Office 3,359,584
Patented Dec. 26, 1967

3,359,584
TOE PULLING OVER AND LASTING MACHINE WITH VAMP GAUGE
Michael M. Becka, Cambridge, and Allen C. Harriman, Brockton, Mass., assignors to Jacob S. Kamborian, Newton, Mass.
Filed May 10, 1966, Ser. No. 549,026
14 Claims. (Cl. 12—10.5)

This invention relates to a gauge for use with a toe pulling over and lasting machine. The machine includes an arrangement for supporting bottom-down a shoe assembly that includes a last having an insole located on its bottom and an upper mounted thereon, means for stretching the vamp of the upper about the forepart of the last preparatory to wiping the margin of the vamp against the insole and means for shifting the vamp on the last to the proper wiping position with the topline of the stretched vamp intersecting a predetermined portion of the cone of the last, this predetermined portion of the last being dependent on the size and style of the shoe being made. The gauge is located above the support and is adapted to point to the predetermined cone portion.

Figure 1:
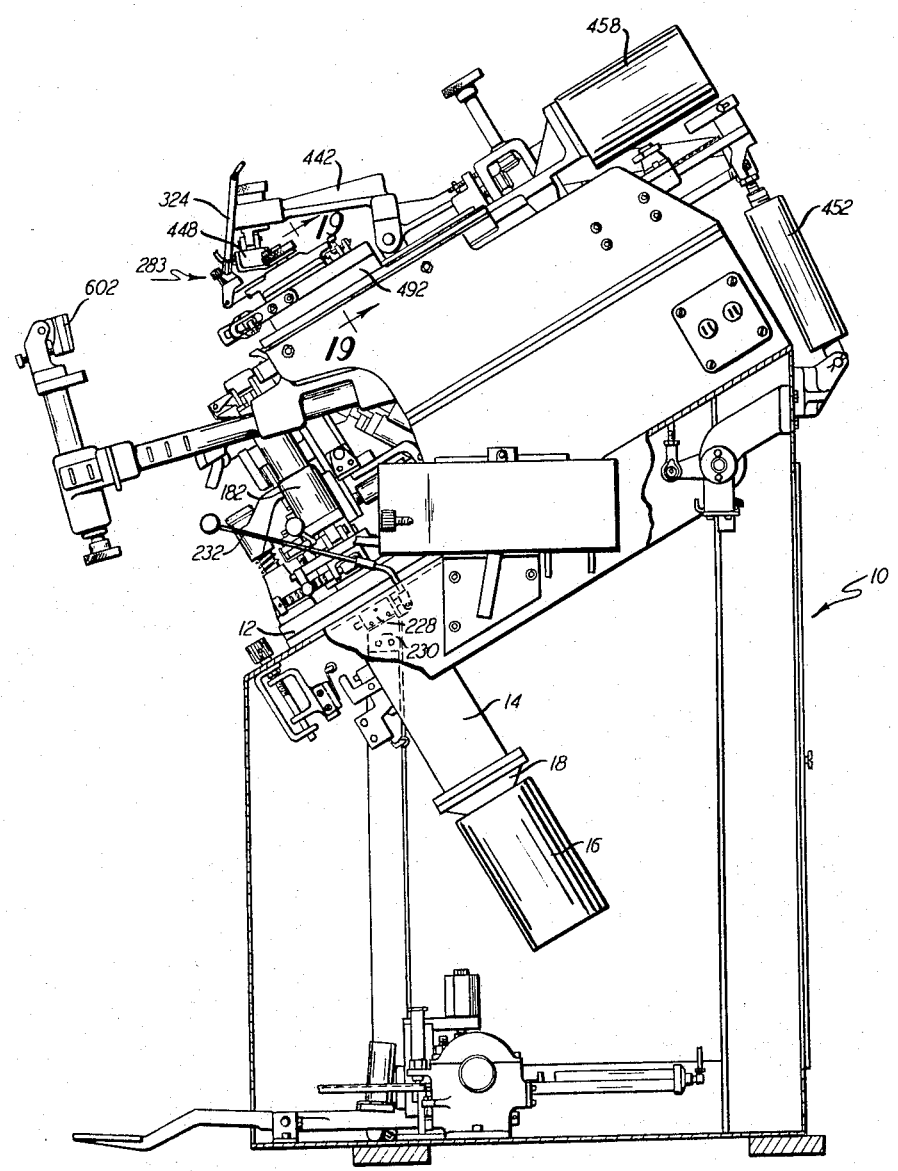
Figure 2:
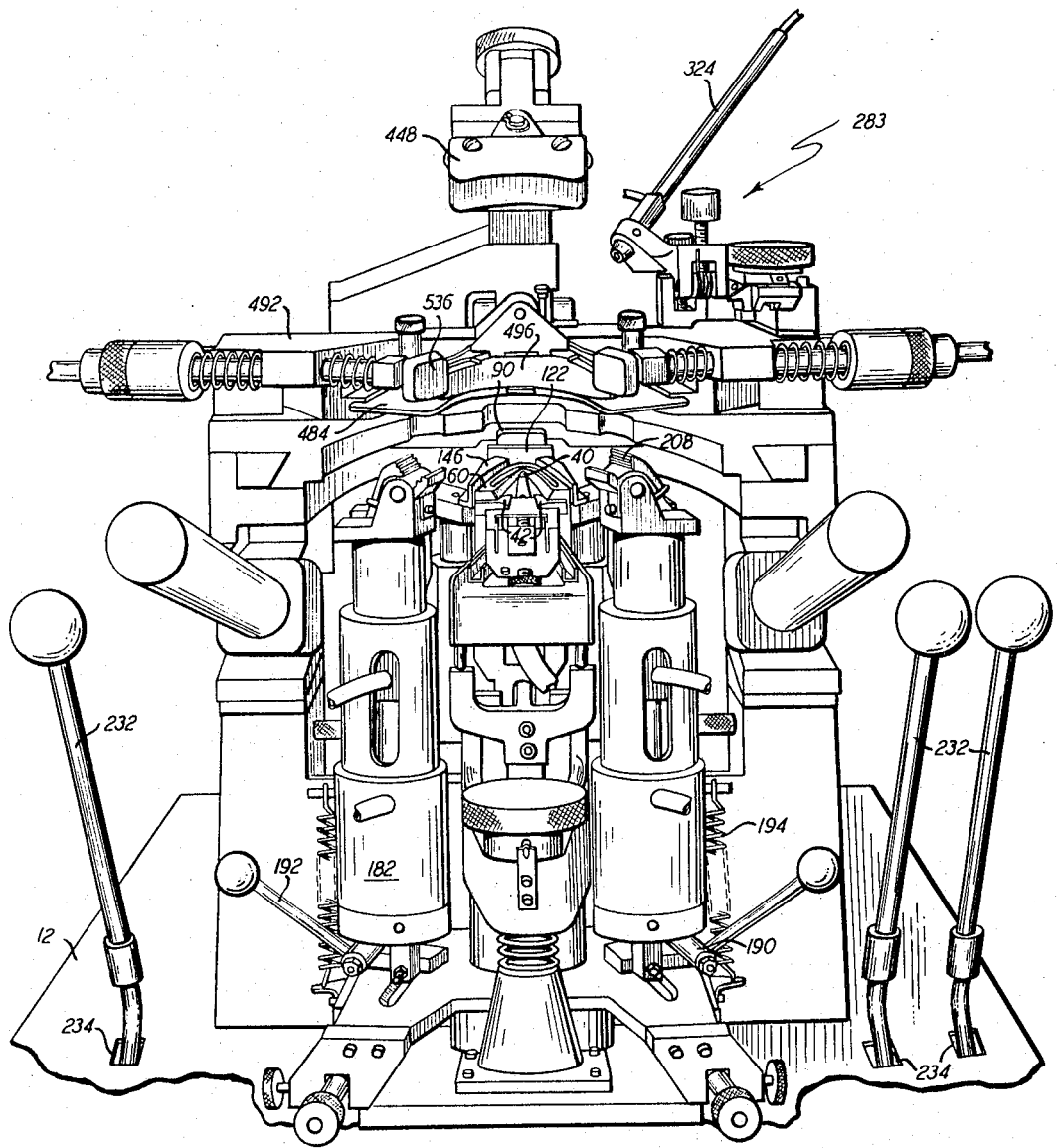
Figure 3:
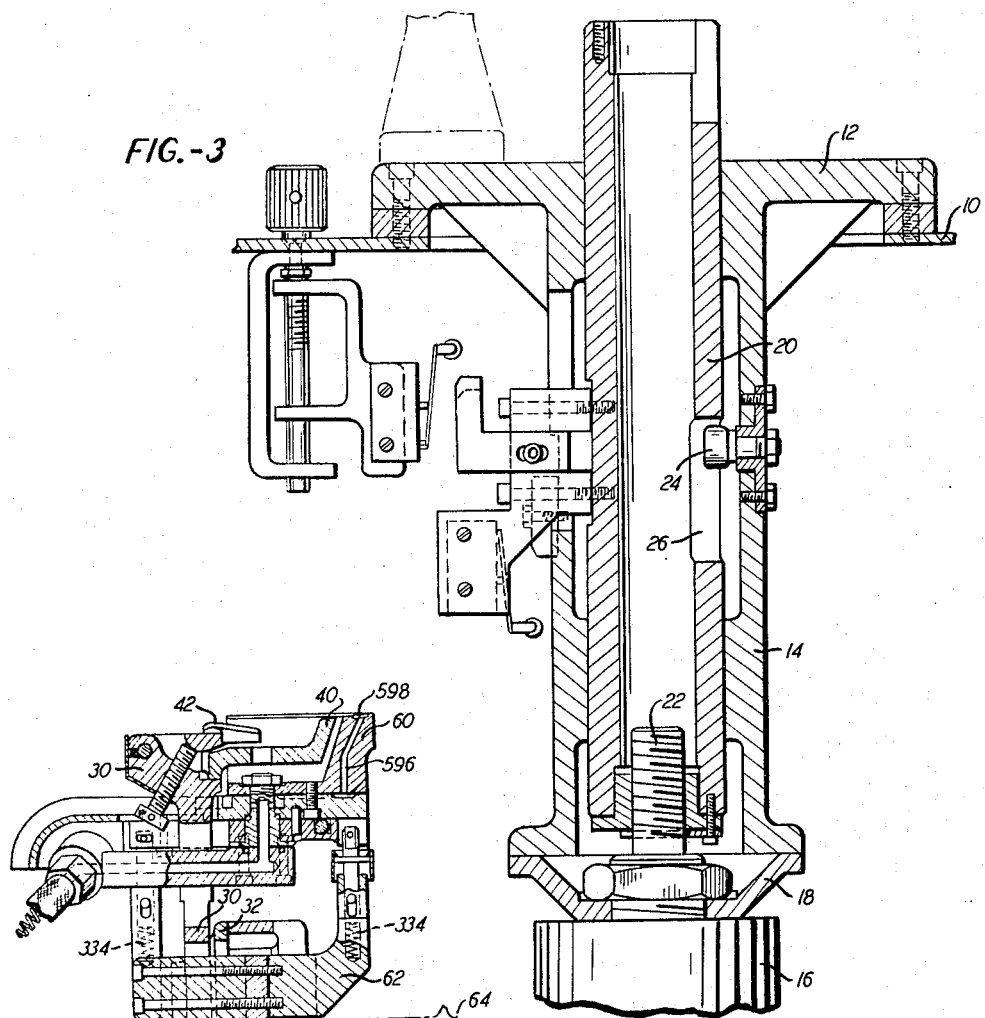
Figure 4:
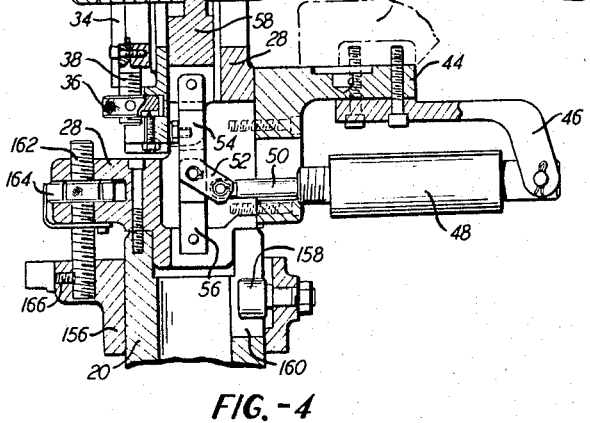
Figure 15:
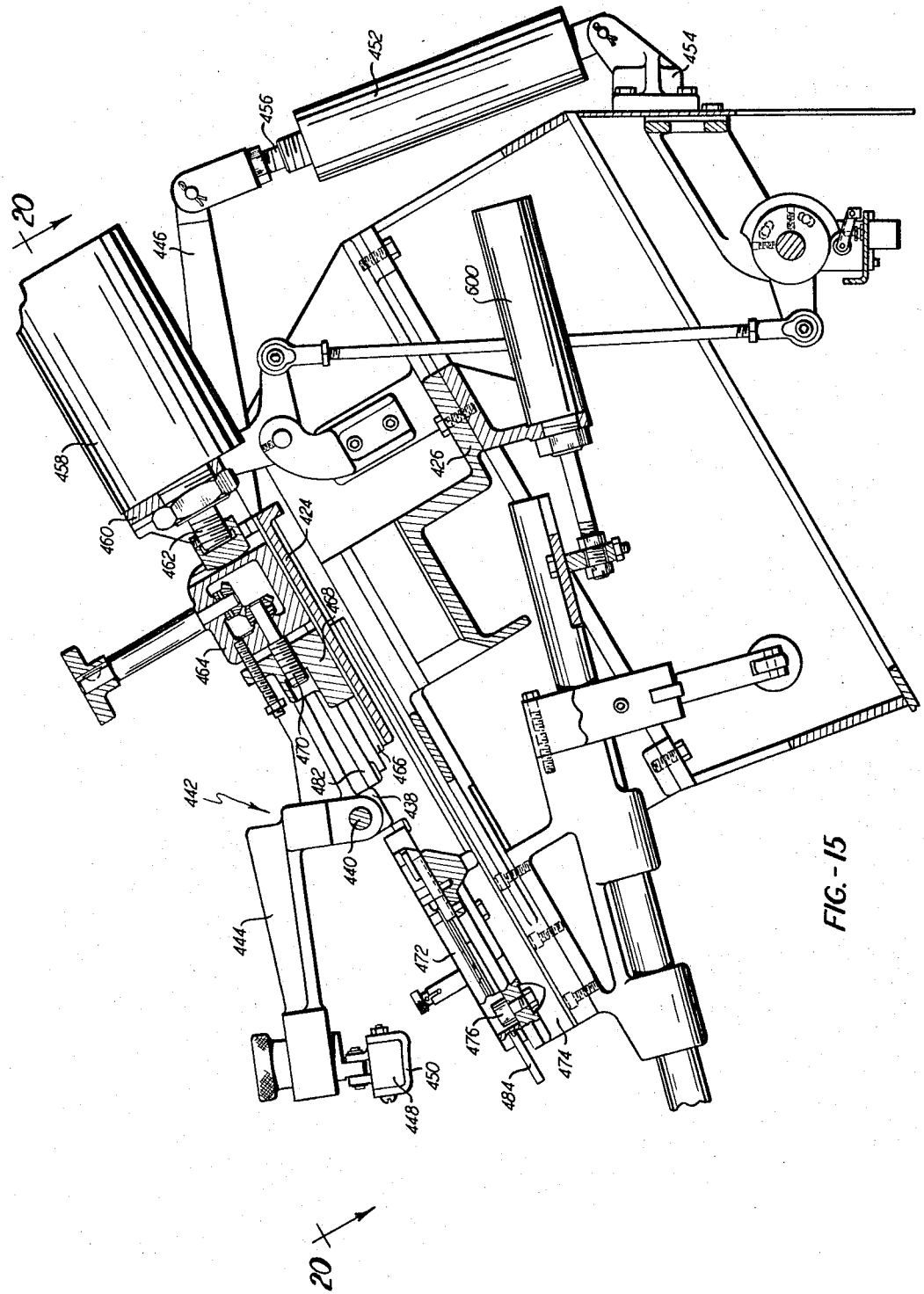
Figure 16:
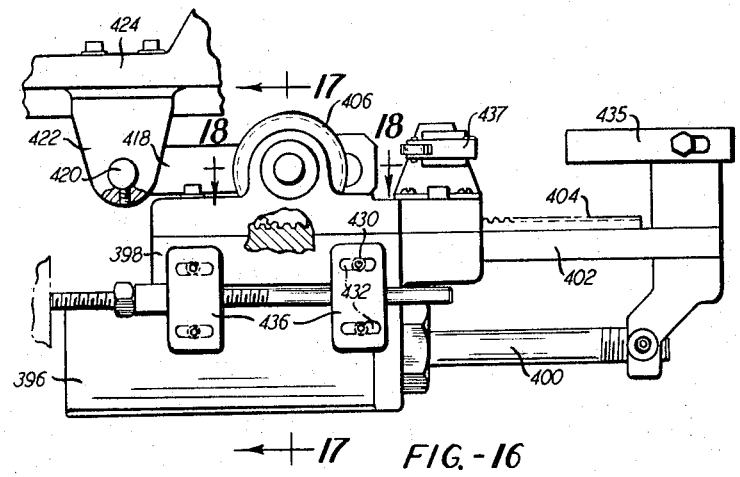
Figure 18:
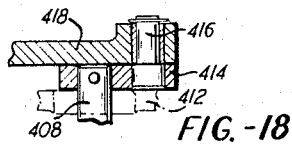
Figure 17:
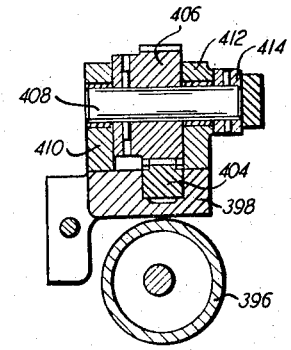
Figure 19:
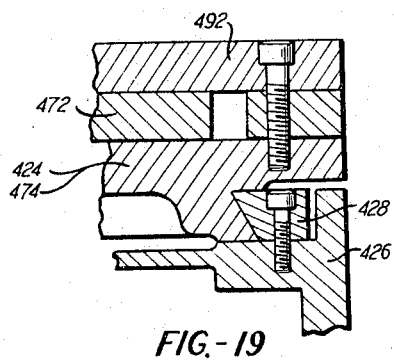
Figure 20:
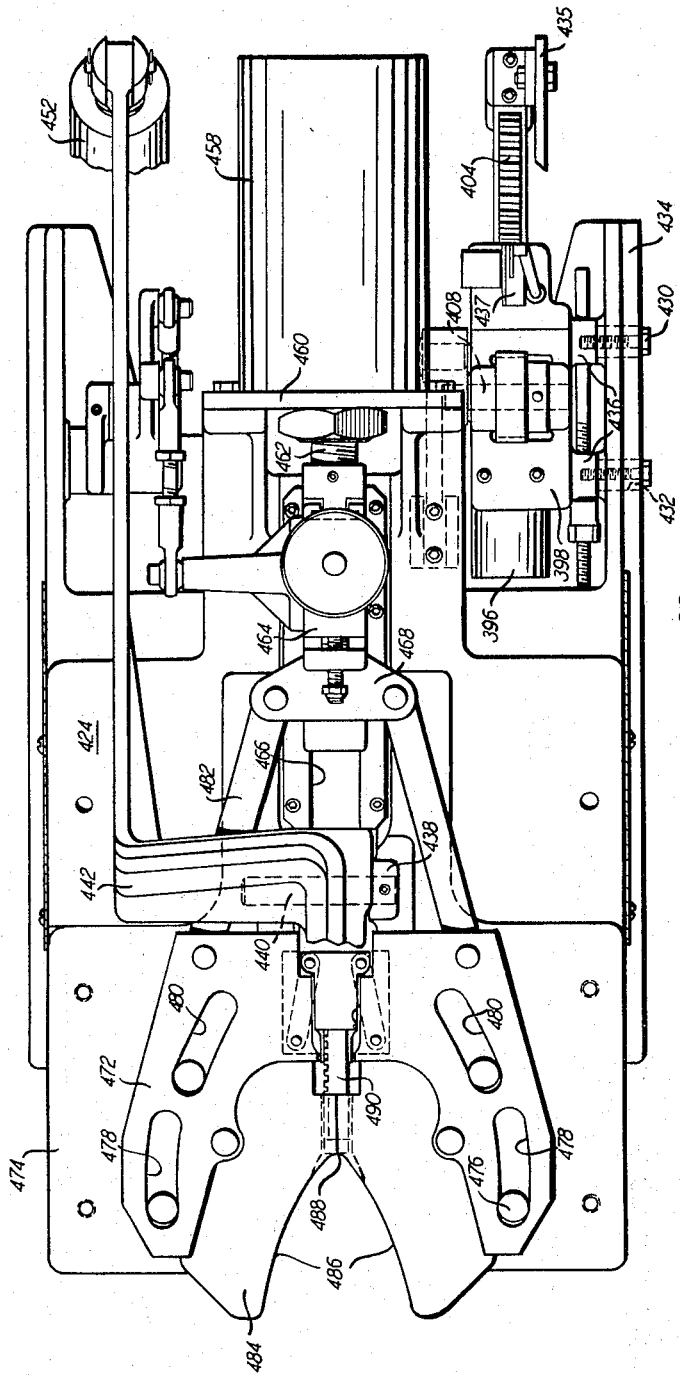
Figures 21, 22, 23:
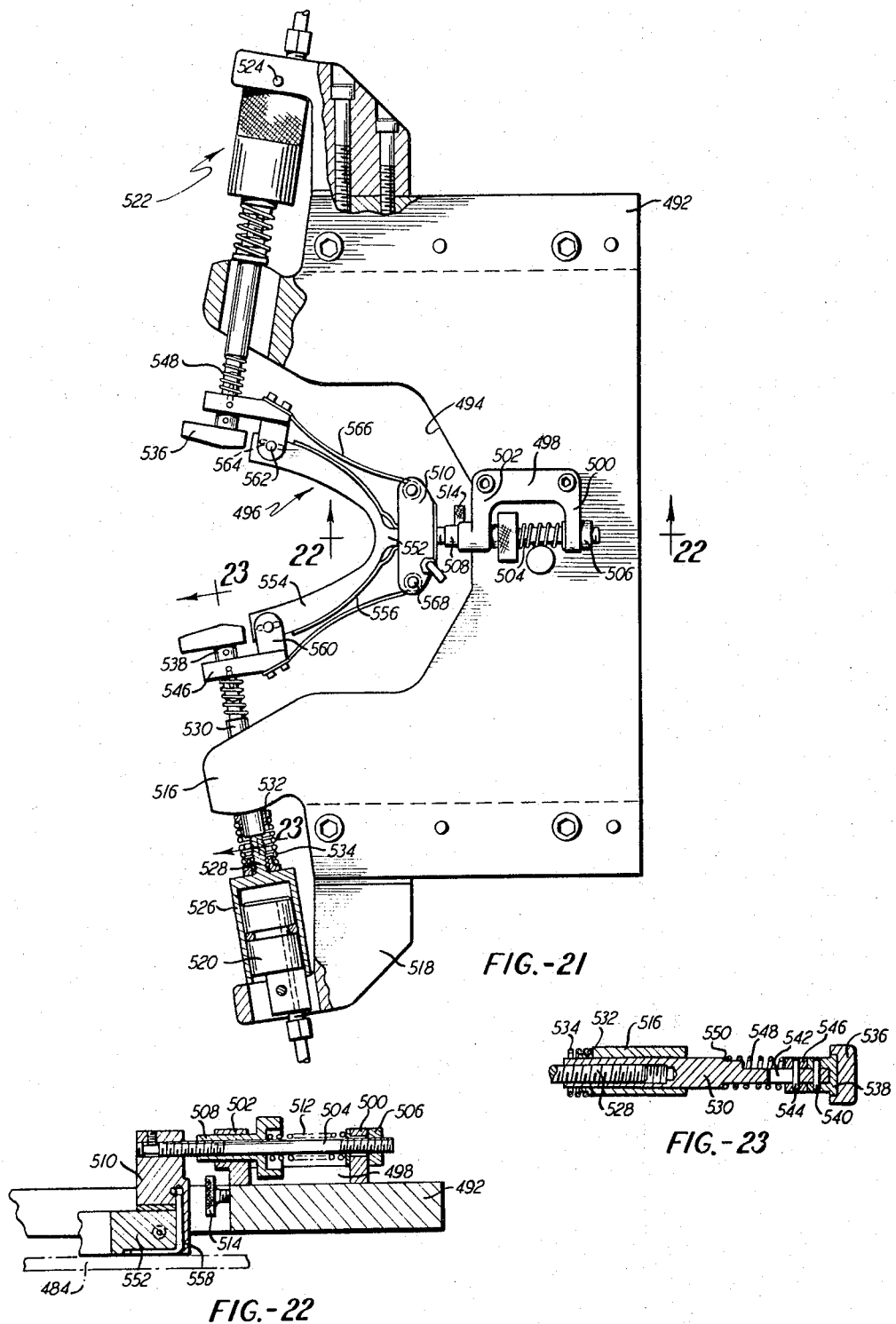
Figure 24:
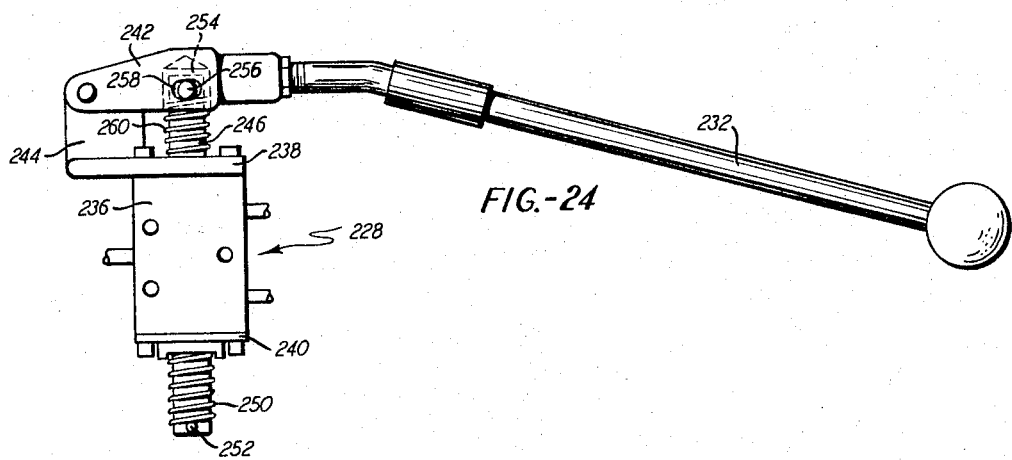
Figure 26:
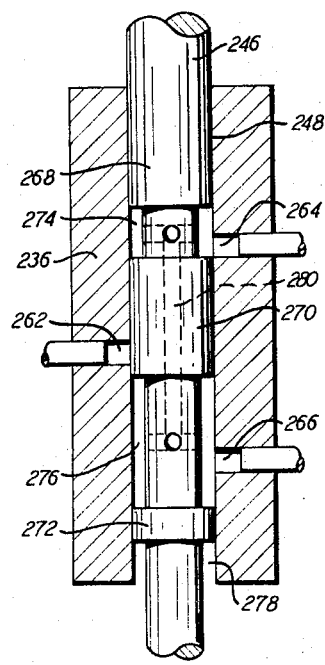
Figure 25:
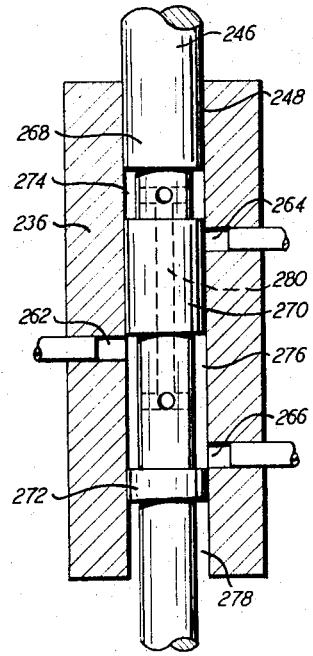
Figure 27:
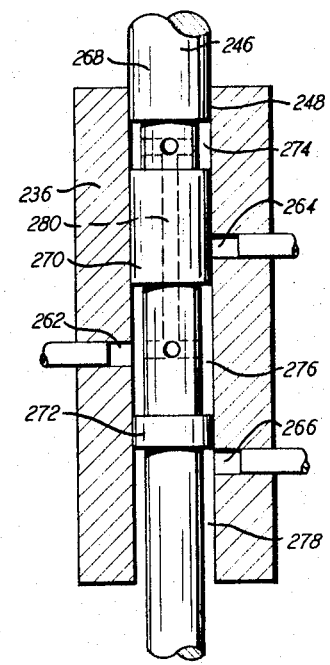
Figure 28:
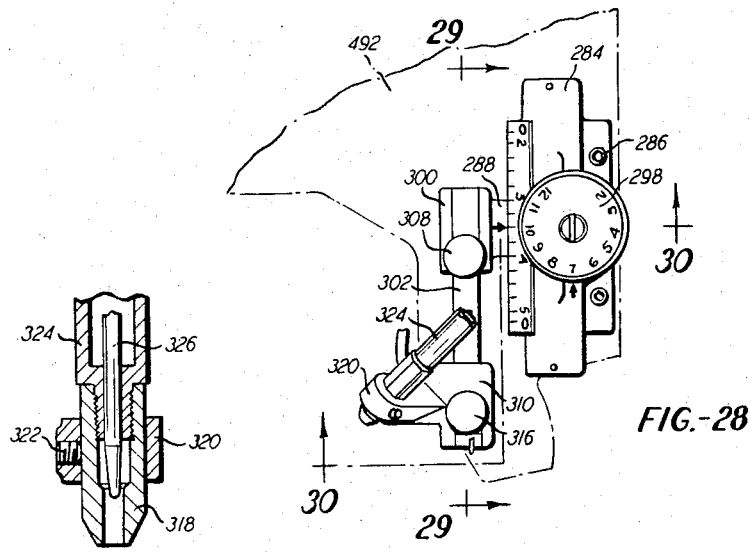
Figure 32:
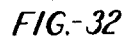
Figure 29:
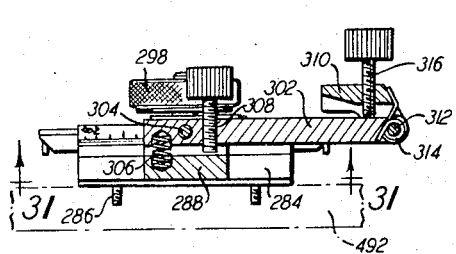
Figure 30:
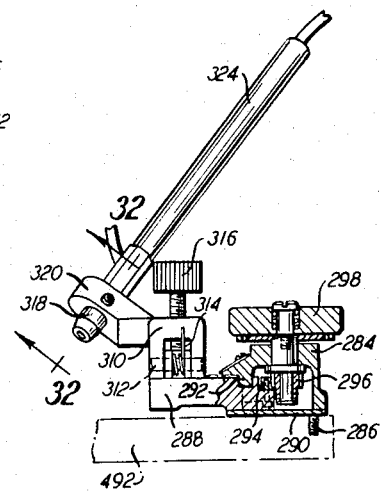
Figure 31:
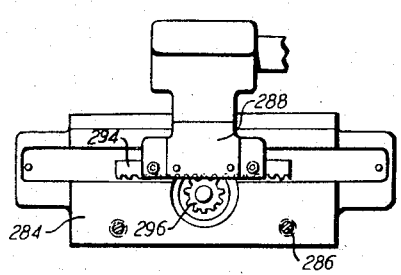
Figure 33:
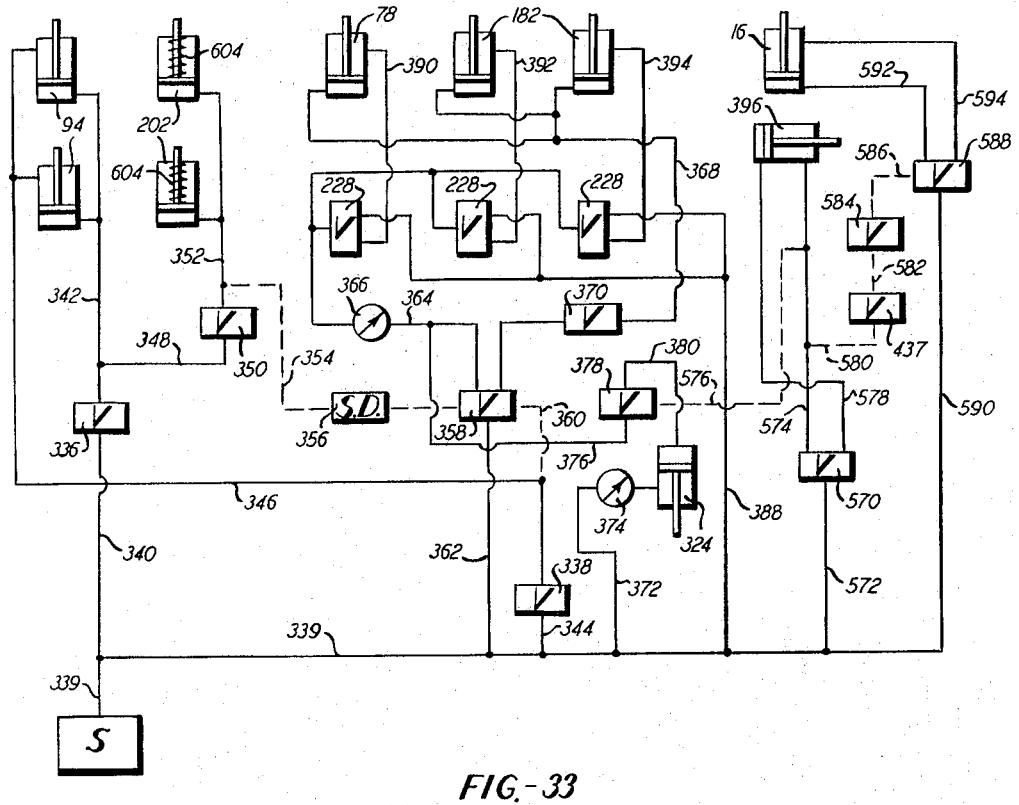
Figure 35A:
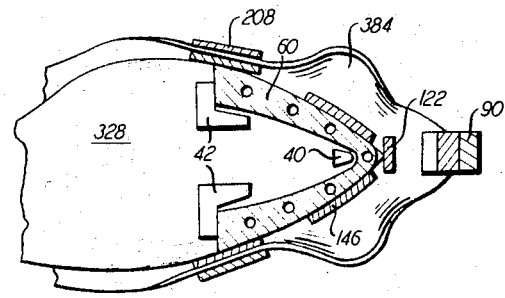
Figure 35B:
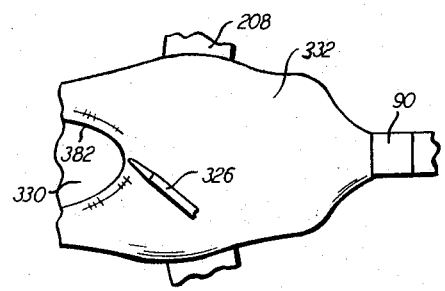
Figure 36:
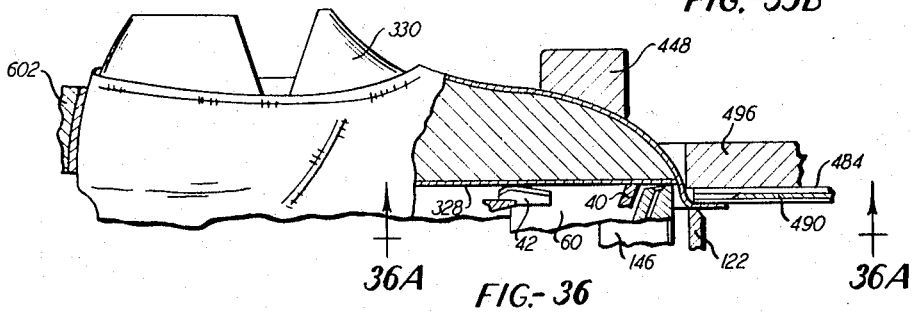
Figure 36A:
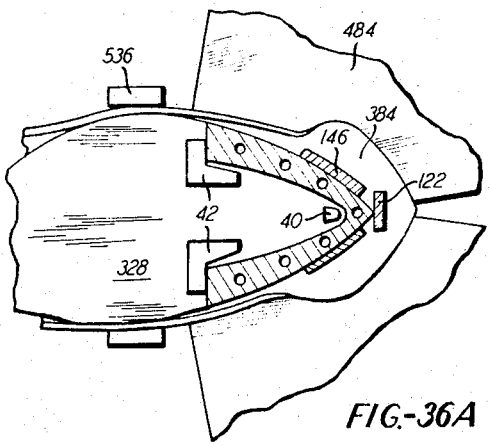

In the accompaning drawings:
FIGURE 1 is a side elevation of the machine;
FIGURE 2 is a front elevation of the upper portion of the machine;
FIGURE 3 is a vertical section of a portion of the machine including a toe post on which the support arrangement for the shoe assembly is mounted;
FIGURE 4 is a vertical section of the support arrangement;
FIGURE 5 is an elevation, partly in section, of a front pincers and a front retarder that form a part of the vamp stretching means;
FIGURE 6 is a view taken on the line 6—6 of FIGURE 5;
FIGURE 7 is a plan view of side retarders that form a part of the vamp stretching means;
FIGURE 8 is a view taken on the line 8—8 of FIGURE 7;
FIGURE 9 is a plan view of a portion of the machine showing the mounting of side pincers that form a part of the vamp stretching means;
FIGURE 10 is a view taken on the line 10—10 of FIGURE 9;
FIGURE 11 is a view taken on the line 11—11 of FIGURE 9;
FIGURE 12 is a view taken on the line 12—12 of FIGURE 9;
FIGURE 13 is an elevation of a side pincers;
FIGURE 14 is a view taken on the line 14—14 of FIGURE 13;
FIGURE 15 is a side elevation, partially in section, of a portion of the machine showing a wiper operating mechanism;
FIGURE 16 is a side elevation of a portion of the machine showing an arrangement for moving the wipers from an out-of-the-way position to a working position;
FIGURE 17 is a view taken on the line 17—17 of FIGURE 16;
FIGURE 18 is a view taken on the line 18—18 of FIGURE 16;
FIGURE 19 is a section taken on the line 19—19 of FIGURE 1;
FIGURE 20 is a view taken on the line 20—20 of FIGURE 15;
FIGURE 21 is a plan view of a shoe conforming yoke and bumpers that form a part of the machine;
FIGURE 22 is a view taken on the line 22—22 of FIGURE 21;
FIGURE 23 is a view taken on the line 23—23 of FIGURE 21;
FIGURE 24 is a view of a valve actuating mechanism that forms a portion of the means for shifting the vamp on the last;
FIGURES 25, 26 and 27 are sections showing the valve of FIGURE 24 in three different positions;
FIGURE 28 is a plan view of the gauge and its mounting;
FIGURE 29 is a view taken on the line 29—29 of FIGURE 28;
FIGURE 30 is a view taken on the line 30—30 of FIGURE 28;
FIGURE 31 is a view taken on the line 31—31 of FIGURE 29;
FIGURE 32 is a view taken on the line 32—32 of FIGURE 30;
FIGURE 33 is a diagram of a part of the control circuit of the machine;
FIGURE 34 is a representation of the shoe assembly as it appears when it is placed in the machine;
FIGURE 34A is a view taken on the line 34A—34A of FIGURE 34;
FIGURE 34B is a view taken on the line 34B—34B of FIGURE 34A;
FIGURE 35 is a representation of the shoe assembly as it appears after the vamp has been stretched about the forepart of the last;
FIGURE 35A is a view taken on the line 35A—35A of FIGURE 35;
FIGURE 35B is a view taken on the line 35B—35B of FIGURE 35;
FIGURE 36 is a representation of the shoe assembly as it appears in the machine just prior to the operation of the wipers to wipe the margin of the vamp against the insole; and
FIGURE 36A is a view taken on the line 36A—36A of FIGURE 36.

The machine disclosed in application Ser. No. 472,525 filed July 16, 1965 has been modified to incorporate the instant invention. Referring to FIGURES 1-3, the machine includes a frame 10 that incorporates a base plate 12 that has a sleeve 14 depending downwardly therefrom. For convenience of operation, the machine is inclined about 30 degrees from the horizontal. However, parts extending in the direction of the plate 12 will hereafter be referred to as extending horizontally and parts extending in the direction of the sleeve 14 will hereafter be referred to as extending vertically. The operator is intended to be located to the left of the machine as seen in FIGURE 1, and a direction extending toward the operator (right to left in FIGURE 1) will be referred to as "forward" while a direction extending away from the operator (left to right in FIGURE 1) will be referred to as "rearward."

An air operated motor 16 (FIGURES 1 and 3) is secured to a cap 18 at the bottom of the sleeve 14, and a toe post 20 is secured to the piston rod 22 of the motor 16 to extend vertically and be slidable within the sleeve 14. A roller 24, bolted to the sleeve 14, is received in a vertical slot 26 in the post 20 to preclude rotation of the post about the axis of the sleeve.

A toe post extension 28 (FIGURE 4) is secured to the upper end of the post 20. A bar 30, which serves as an insole rest mount, is slidably mounted for vertical movement between a bearing plate 32 and gibs 34 that are secured to the post extension 28. A nut 36, rotatably mounted in the post extension 28, is in threaded engagement with a screw 38 that is fastened to the bar 30. A toe insole rest 40 and a pair of forepart insole rests 42 (see FIGURE 2) are mounted to the bar 30 with the forepart insole rests 42 located forwardly of and on opposite sides of the toe insole rest 40. A rearwardly extending ledge 44 of the post extension 28 has a hanger 46 depending therefrom. An air operated motor 48 is pivoted to the hanger 46. The piston rod 50 of the motor 48 is pivoted to a link 52, and the link 52 is pivoted to a pair of toggle links 54 and 56. The link 56 extends downwardly of the link 52 and is pivoted to the post extension 28 while the link 54 extends upwardly of the link 52 and is pivoted to a slide 58 that is guided for vertical sliding movement by the post extension 28 and the bearing plate 32. An applicator-support 60 is mounted to a mount 62 that is secured to the slide 58. The applicator-support 60 lies outwardly and rearwardly of the insole rests 40, 42 and has a configuration corresponding to the periphery of the toe portion of the insole of the shoe to be lasted.

Referring to FIGURES 5 and 6, a housing 64 is secured to and extends upwardly of the ledge 44. A bracket 66, located rearwardly of the housing 64, has an extension 68 that is pivoted on a pin 70 extending outwardly of the housing. A cam 72 is mounted on the bracket 66. A compression spring 74, interposed between the bracket 66 and the housing 64, serves to swing the bracket about the axis of the pin 70 and cause the cam 72 to bear against a stop element 76 that is secured to the housing 64. An air operated motor 78 is secured to a block 80 that is secured to the bracket 66. The motor 78 has a piston rod 82 extending upwardly and forwardly thereof. A block 84 is secured to the piston rod 82, and a bar 86 is rigidly connected to the block 84. The bar 86 is slidably mounted in a guideway in the bracket 66. The upper jaw 88 of a front pincers 90 is secured to the upper end of the bar 86. The lower end of the bar 86 is secured to a bracket 92 on which a pair of air operated motors 94 are mounted. The piston rods 96 of the motors 94 are connected to a hanger 98, and a pin 100 is threaded into the hanger to extend upwardly thereof. The pin 100 is connected to a bar 102 that is slidable in ways formed in the bar 86. The lower jaw 104 of the pincers 90 is mounted to the upper end of the bar 102.

Above the ledge 44 the housing 64 is formed into a cylinder 106 in which a piston 108 is vertically movable. A piston rod 110, extending upwardly of the piston 108, is slidable in a bushing 112 that in turn is slidably mounted on the piston rod 110. A shoulder 114 is provided at the upper end of the bushing 112 and bears against the housing 64. A compression spring 116, interposed between the shoulder 114 and the piston 108, yieldably seats the shoulder against the housing bottom and yieldably urges the piston 108 downwardly against the force of the pressurized air that is normally in the cylinder 106. A bar 118, connected to and extending upwardly of the rod 110, is slidable in a vertical guideway 120 formed at the front end of the housing 64 above the cylinder 106, and a front retarder blade 122 is affixed to the top of the bar 118. The pincers 90 and the retarder blade 122 are both positioned rearwardly of the applicator-support 60 and the insole rests 40, 42.

Referring to FIGURES 7 and 8, a gib 124 is bolted to the ledge 44 forwardly of the housing 64 on each side of the applicator-support 60 and the insole rests 40, 42 by means of headed bolts 126. A column 128 is slidably mounted on each gib 124 for inward and outward movement. Struts 130 are secured to the ledge 44 outwardly of each column 128. A knob 132, rotatably mounted in each strut 130, has an inwardly directed screw 134 secured thereto that is threaded into a column 128, whereby the position of each column on its gib 124 may be adjusted by rotating its associated knob 132. A cavity 136 is provided in each column 128 and an upwardly extending air actuated motor 138 is mounted in each cavity. A line 140 is connected to the bottom of each motor 138 to thereby enable pressurized air to force the piston rods 142 of the motors 138 upwardly. Each of the piston rods 142 is pinned to a block 144 and a side retarder blade 146 is secured in each block 144 to extend upwardly thereof. A sleeve 148 is welded to each block 144. Each sleeve 148 extends downwardly of a block 144 into a cavity 136 between a motor 138 and a column 128. A spline 152, secured to each sleeve 148, extends into a vertical groove 154 provided in each of the columns 128 whereby the blocks 144 and the retarder blades 146 are precluded from movement about the vertical axes of the sleeves 148 during their vertical movements in response to actuations of the motors 138.

A base 156 (FIGURE 4) is slidably mounted on the toe post 20 below the toe post extension 28 and above the plate 12 by way of a roller 158 secured to the base and extending into a vertically extending slot 160 in the post. A bolt 162, extending through a flange on the toe post extension 28, is threaded into a nut 164 that is rotatably mounted in the flange. The bottom of the bolt 162 is threaded into the base 156 and is locked thereto by a set screw 166.

Referring to FIGURES 9–12, the base 156 has a pair of rearwardly convergent slots 168 extending therethrough on opposite sides of the post 20. A U-shaped block 170 is located below the base 156 straddling each slot 168. A pin 172 is mounted in each block 170 to extend through a slot 168. A sleeve 174, extending through each slot 168, embraces each pin 172 with the bottom of the sleeves lying on the blocks 170. A stop plate 176 is located above the base 156 to straddle each slot 168 on opposite sides of each pin 172 and sleeve 174. A cross-pin 178 extends through each associated stop plate 176, sleeve 174 and pin 172 to prevent relative movement of these members about the axes of the pins 172. A universal joint 180 is connected, as by welding, to the upper ends of each pin 172 and sleeve 174 and an air actuated motor 182, which acts as a side pincers carrier, is connected to and extends upwardly of the top of each universal joint 180. A lug 184 extending downwardly of each motor 182 has a stop member in the form of a set screw 186 threaded thereon that is adapted to bear against its associated stop plate 176. A shaft 188, rotatably mounted in each stop plate 176, has an eccentric cam 190 and a handle 192 secured thereto. A tension spring 194 extending between each motor 182 and a bracket 196 secured to the base 156 serves to yieldably urge the base 198 of each motor against a cam 190.

Referring to FIGURES 13 and 14, the piston rod 200 of each motor 182 has a spring return air actuated motor 202 connected thereto that is slidably mounted in the motor 182. The inlet pipe 204 of each motor 202 rides in a slot 206 formed in the motors 182 to preclude rotation of the motors 202 with respect to the motors 182. A side pincers 208 is mounted on a bracket 210 that is affixed to the top of each motor 202. Each pincers 208 comprises an upper jaw 212 and a lower jaw 214, both jaws being swingable about a pin 216 mounted in the bracket 210. Elastic bands 218 extending about the jaws 212 and 214 serve to yieldably urge the jaws to open position. The jaws 212 and 214 respectively have downwardly extending legs 220 and 222 having rollers thereon that are positioned above a cone-shaped cam 224 formed at the top of the piston rod 226 of each motor 202.

Referring to FIGURES 16–20, an air actuated slide plate motor 396, that is secured to a block 398, has a piston rod 400 extending rearwardly thereof. The piston rod 400 is secured to a bar 402 that is slidably mounted in the block 398 above the piston rod. A rack 404 mounted on the bar 402 is in mesh with a pinion 406 that is pinned to a shaft 408, and the shaft is rotatable in a pair of trunnions 410 and 412 affixed to the block 398. A crank 414, pinned to the shaft 408, is pivotally connected by a pin 416 to a pitman 418, and the pitman 418 is pivotally connected by a pin 420 to a lug 422 that depends from a slide plate 424. The slide plate 424 is slidably mounted for forward and rearward movement, rearwardly of the insole rests 40, 42, applicator-support 60, pincers 90, 208 and retarders 122, 146, in a head 426, that forms a part of the frame 10, on gibs 428 (see FIGURES 15 and 19). The block 398 is secured to the frame 10 by bolts 430 that extend through slots 432 in a wall 434 of the frame and are threaded into flanges 436 formed on the block 398. A cam 435 mounted on the bar 402 is in alignment with a normally closed valve 437 mounted on the block 398.

Referring to FIGURES 15 and 20, trunnions 438 upstanding from the slide plate 424 mount a pin 440 on which is swingably mounted a hold-down lever 442. The lever 442 has a front leg 444 extending forwardly of the pin 440 and a rear leg 446 extending rearwardly of the pin 440. A toe hold-down 448, having a flexible hold-down pad 450 thereon, is secured to the front end of the lever leg 444. An air actuated motor 452, pivoted to a bracket 454 secured to the frame 10, has a piston rod 456 that is pivoted to the rear end of the lever leg 446.

Referring to FIGURES 15 and 20, an air actuated motor 458 is fastened to a flange 460 secured to the rear of the slide plate 424. The piston rod 462 of the motor 458 is connected to a housing 464 that is slidably mounted in gibs 466 formed in the slide plate 424. A block 468 is slidably mounted in the gibs 466 forwardly of the housing 464 and is connected to the housing by a bolt 470. A pair of symmetrically disposed wiper cams 472 are slidably supported on a thickened block 474 that forms the forward end of the slide plate 424. The block 474 has pins 476 upstanding therefrom that extend into slots or cam tracks 478 and 480 formed in the wiper cams 472. Forwardly divergent links 482 are pivotally connected at their rear ends to the block 468 and at their forward ends to the wiper cams 472. Wipers 484 are connected to and extend forwardly of the wiper cams 472. The wipers, as is conventional, are flat plates having forwardly divergent edges 486 that diverge from a vertex 488. A knife 490 is slidably mounted in cutouts provided in adjoining surfaces of the wipers 484 rearwardly of the vertex 488, as disclosed more fully in the aforementioned application Ser. No. 472,525.

A cover block 492 is secured to the block 474 and extends above the wiper cams 472 (FIGURES 1 and 19). Referring to FIGURES 21–23, the block 492 has a cut-out 494 at its forward end to accommodate a flexible shoe conforming pad or yoke 496. A U-shaped bracket 498, having a rear leg 500 and a front leg 502, is bolted to the block 492. A stud 504 extending through the legs has a stop nut 506 threaded thereon rearwardly of the leg 500. A sleeve, that is formed as a nut 508, is threaded on the stud 504 and is slidably guided in the front leg 502. The forward end of the stud 504 is threaded into and secured to a yoke mounting bracket 510. The rearward end of the nut 508 is formed into a cup that receives a compression spring 512 which is coiled about the stud 504 and extends between the nut 508 and the leg 500. A stop screw 514 is threaded into the block 492 under the stud 504 and rearwardly of the bracket 510. The block 492 is formed into inner flanges 516 at the forward ends of the cut-out 494 and outer flanges 518 that are bolted to the block. The piston 520 of an air actuated motor 522 is pivotally secured to each flange 518 by a pin 524 to extend inwardly thereof and a cylinder 526 is slidable on each piston 520. Each cylinder 526 has a screw 528 extending inwardly thereof that is threaded into a bar 530, the bars 530 being slidably mounted in the inner flanges 516. A sleeve 532 is slidably mounted on each bar 530 to bear against the exterior of an inner flange 516, and compression springs 534 interposed between the sleeves 532 and the cylinders 526 serve to yieldably urge the cylinders and the bars 530 outwardly with the cylinders abutting against the outer flanges 518. A rubber bumper 536 is mounted on a mount 538 that in turn is pivotally secured to the inner end of each bar 530 by a pin 540. Slots 542, formed on the bars 530 outwardly of the bumpers 536 and pins 540, receive pins 544 that are secured to brackets 546. Compression springs 548, interposed between shoulders 550 on the bars 530 and the brackets 546 serve to yieldably urge the brackets 546 inwardly with the pins 544 engaging the inner ends of the slots 542.

The yoke 496 is of substantially U-shape and has a bight 552 and a pair of legs 554 extending forwardly of the bight on opposite sides of the bight. The yoke is made of a flexible deformable material such as Teflon and has a pair of bowed springs 556 extending exteriorly of each yoke leg from the bight forwardly thereof. The bight 552 of the yoke is received in a socket 558 in the bracket 510. An inwardly extending support arm 560 on each bracket 546 has a downwardly extending pin 562 that is inserted in a slot 564 in each yoke leg 554. Each bracket 546 has a spring arm 566 secured thereto and extending rearwardly thereof that is entwined at its rear end on a pin 568 located in the mounting bracket 510. The yoke 496 is located in the machine directly above the wipers 484.

Referring to FIGURES 1 and 2, three identical valves 228 are secured to hangers 230 that depend from the plate 12, two of the valves being located on one side of the machine and the third valve being located on the other side of the machine. A handle 232 described below, is associated with each valve and extends upwardly of its associated valve through a slot 234 in the plate 12.

The valves 228 are constructed similarly to those disclosed in Patent No. 3,233,261. As shown in FIGURE 24, each of these valves comprises a valve housing 236 having cap plates 238 and 240. A lever 242 is pivoted to a lug 244 formed in the cap plate 238, and the handle 232 is secured to the lever. A spool 246 is slidably mounted in a bore 248 (FIGURES 25–27) in the housing 236 and extends beyond the cap plates 238 and 240. A compression spring 250 is coiled about the spool 246 between the cap plate 240 and a pin 252 projecting out of the lower end of the spool. The upper end of the spool is received in a recess 254 in the lever 242. A pin 256, projecting out of the upper end of the spool within the recess 254, is slidably received in slots 258 formed in the lever 242. A compression spring 260 is coiled about the spool 246 between the cap plate 238 and the pin 256. The valve housing 236 has a port 262 located midway of its length, a port 264 above the port 262 and a port 266 located below the port 262. Air lines, described more fully below, enter the ports 262, 264 and 266. The valve spool 246 has lands 268, 270 and 272 that have a diameter corresponding to the diameter of the bore 248 so as to be snugly slidable in the bore. An annular chamber 274 is formed between the lands 268 and 270, an annular chamber 276 is formed between the lands 270 and 272, and an annular chamber 278 is formed below the land 272. A conduit 280 connects the chambers 274 and 276.

The springs 250 and 260 serve to normally position the valve spool 246 in a median position wherein the port 264 is blocked by the land 270 and the ports 262 and 266 are in communication through the chamber 276 as shown in FIGURE 25. A downward movement of the handle 232 will move the spool 246 downwardly from the FIGURE 25 position to the FIGURE 26 position wherein the land 270 blocks the port 262 and the ports 264 and 266 are in communication by way of the chamber 274, the conduit 280 and the chamber 276. An upward movement of the handle 232 will cause the spool 246 to move upwardly from the FIGURE 25 position to the FIGURE 27 position wherein the port 266 is in communication with the atmosphere through the chamber 278, the port 264 is blocked by the land 270, and fluid entering the port 262 will be trapped by the lands 268, 270 and 272.

The machine includes a gauging mechanism 283 that is mounted on the cover block 492 (see FIGURES 1 and 2). Referring to FIGURES 28–31, the gauging mechanism 283 includes a housing 284 that is secured to the block 492 on one side of the longitudinal center line of the machine by fasteners 286. A slide block 288 is mounted in the housing 284 for forward and rearward movement between a plate 290 at the bottom of the housing 284 and a gib 292 on the housing. A rack 294 on the block 288 is in mesh with a pinion 296 that is rotatably mounted in the housing 284 and that may be rotated by a knob 298. A clevis 300 is formed on a lateral extension of the block 288. An arm 302 is pivotally mounted by means of a pivot pin 304 to the clevis 300 for swinging movement in a vertical plane. The arm 302 extends forwardly of the clevis and its front end is yieldably urged downwardly by a compression spring 306 interposed between the block 288 and the arm 302. A bolt 308, threaded into the arm 302, is adapted to bear against the block 288 to adjust the extent that the front end of the arm 302 is urged downwardly by the spring 306. A mount 310 is pivoted to the front end of the arm 302 by means of a pivot pin 312 for swinging movement in a vertical plane. A coil spring 314 is entwine about the pin 312 and has one of its ends bearing against the arm 302 and its other end bearing against the mount 310 so as to yieldably urge the mount 310 downwardly about the pin 312. A bolt 316 threaded into the mount 310 is adapted to bear against the arm 302 to adjust the extent that the mount 310 is urged downwardly by the spring 314.

A sleeve 318 (FIGURE 32) is secured to a flange 320 of the mount 310 by a set screw 322. An air operated gauge motor 324 is threaded into the sleeve 318. The piston of the motor 324 has a gauge rod 326 secured thereto. In the idle condition of the machine, the gauge rod 326 is retracted into the motor 324 so as to be concealed by the sleeve 318. The motor 324 and the gauge rod 326 lie on an axis that is inclined downwardly, forwardly and inwardly toward the longitudinal center line of the machine.

In the idle condition of the machine: the motor 16 and the insole rests 40, 42 carried thereby are in a lowered condition; the motor 48 is in the FIGURE 4 position so that the applicator-support 60 is in the upper position shown in FIGURE 4; the front pincers 90 is in a raised position with the jaw 88 in its uppermost position due to the projection of the piston rod 82 upwardly of the motor 78 and the retraction of the piston rods 96 into the motors 94; pressurized air is entering the cylinder 106 to raise the piston rod 110 and the front retarder 122 with respect to the housing 64 against the resistance of the spring 116; the side retarders 146 are held in a raised position by the motors 138 under relatively low pressure; the motors 182 are held in an outward position against the cams 190 by the springs 194 and are held by gravity in a forward position with the set screws 186 bearing against the stop plates 176 due to the inclination from the vertical of the motors 182 (FIGURE 1), the piston rods 200 of the motors 182 are in an elevated position and the motors 202 are in a lowered position with respect to the piston rods 200 so that the side pincers 208 are in a raised position with their jaws opens; the piston rod 400 is projected outwardly of the motor 396 so that the slide plate 424 and the parts carried thereby are in a rearward out-of-the-way position; the piston rod 456 is retracted into the motor 452 so that the hold-down 448 is in an elevated position; the piston rod 462 is retracted into the motor 458 so that the wipers 484 are in their rearward open position; the spring 512 yieldably urges the bight 552 of the yoke 496 forwardly with the nut 506 bearing against the rear leg 500; the yoke legs 554 are yieldably urged inwardly with respect to the bars 530 under the influence of the springs 548; the cylinders 526 of the motors 522 bear against the outer flanges 518 with no pressurized air entering the motors 522 thus maintaining the bumpers 536 outward of the inner peripheral wall of the yoke 496; and the gauge rod 326 is retracted into the motor 324.

Referring to FIGURES 34, 34A and 34B, a shoe assembly is presented bottom-down to the machine to be pulled over and toe lasted. The shoe assembly comprises a shoe insole 328 located on the bottom of a last 330, preferably by being tacked thereto, and the vamp 332 of a shoe upper draped over the forepart of the last. The shoe has preferably been heel seat lasted prior to presentation to the machine. The insole is brought to bear against the top of the applicator-support 60, which at this time is resiliently urged above the level of the insole rests 40, 42 by springs 334 (FIGURE 4) in the mount 62, so that the appliactor-support bears against and supports the margin of the toe portion of the insole. The outer periphery of the last is caused to bear against the front retarder 122 and the side retarders 146 so that the retarders act as gauges to accurately locate the shoe assembly in the machine. The toe end of the vamp margin is placed between the open jaws of the front pincers 90 and the forepart portions of the vamp margin are inserted between the open jaws of the side pincers 208.

FIGURE 33 shows a simplified schematic representation of a portion of the pneumatic control circuit of the machine with the source of air for the control system designated as S, the pressure lines drawn in solid lines and the pilot lines drawn in dashed lines.

Referring to FIGURE 33, at this time a valve 336 is shifted into open position from its normally closed position and a valve 338 is shifted into closed position from its normally open position. The opening of the valve 336 causes pressurized air to pass from the source through a line 339, a line 340, the valve 336 and a line 342 to the motors 94 to actuate these motors to close the jaws of the front pincers 90 on the toe end portion of the vamp margin. In the idle condition of the machine, pressurized air had entered the motors 94 to maintain the pincers 90 open from the line 339 through a line 344, the valve 338 and a line 346. During the actuation of the motors 94 to close the jaws of the pincers 90, the air above the pistons of these motor egresses therefrom through the line 346 and the valve 338 and is exhausted to atmosphere from the valve 338.

The opening of the valve 336 also causes air to pass through this valve and a line 348 to a normally closed valve 350.

Now the valve 350 is opened, while the valve 336 remains opened, to enable pressurized air to pass from the line 348 through the valve 350 and a line 352 to the motors 202 to actuate these motors to raise the cams 224 to close the jaws 212 and 214 of the side pincers 208 and thereby cause the side pincers 208 to grip the forepart portions of the vamp margin. At the same time, pressurized air passes from the line 352 and a pilot line 354 to a sequencing device 356 to shift a valve 358 after the actuation of the motors 202. The sequencing device 356 is a conventional item so constructed as to offer resistance to the passage of air therethrough so that the air will follow an alternative path other than through the sequencing device if one is available. When such an alternative path is not available or is blocked, the air will go through the sequencing device. The valve 358 had been maintained in its initial position by pressurized air passing from the valve 338 through a pilot line 360 to the valve 358. The closure of the valve 338 had allowed the air in the line 360 to be exhausted to atmosphere through this valve. The shifting of the valve 358 enables pressurized air to pass from the line 339 through a line 362, the valve 358, a line 364, a low pressure regulator 366, the ports 262 and 266 of the valves 228, and lines 390, 392 and 394 to the motors 78 and 182 to actuate these motors. Prior to the shifting of the valve 358, pressurized air had passed to the motors 78 and 182 from the valve 358 and a line 368 to maintain these motors in their idle condition. The air egressing from the motors 78 and 182 in response to the shifting of the valve 358 is vented to atmoshpere through the line 368 and a quick exhaust valve 370. The actuation of the motor 78 causes the front pincers 90 to move downwardly and rearwardly away from the last to thereby stretch the toe portion of the vamp margin about the toe end of the last and the actuation of the motors 182 causes these motors to move the side pincers 208 downwardly to stretch the forepart portions of the vamp margin about the last.

The gauge rod 326 is maintained in its retracted position in the motor 324 by pressurized air passing into the motor 324 at less than full line pressure from the line 339 through a line 372 and a pressure regualtor 374. The shifting of the valve 358 causes air at full line pressure to pass from the line 364 through a line 376, a normally open valve 378 and a line 380 to the motor 324 to cause the piston of the motor 324 to overcome the lower pressure in the line 372 and project the gauge rod 326 downwardly out of the motor 324.

The machine now comes to a stop with the parts in the position shown in FIGURES 35, 35A and 35B.

The aforesaid downward and rearward movements of the front pincers 90 causes the vamp 332 to be pulled and stretched about the toe end of the last 330 and also in a heel to toe direction with the vamp dragging about the front retarder blade 122. The downward movement of the side pincers 208 causes the vamp at the forepart to be stretched tightly about the last 330 with the vamp dragging about the side retarders 146. The universal joints 180 enable the motors 182 and the side pincers 208 carried thereby to swing rearwardly towards the toe of the shoe assembly and inwardly of the shoe assembly during the downward movement of the side pincers. Due to the inclination from the vertical of the motors 182 as shown in FIGURE 1, these motors and the side pincers are normally tilted from the vertical to a position where the set screws 186 engage the stop plates 176, and the set screws ride off the stop plates during the toeward movement of the motors 182 and side pincers 208. The bases 198 of the motors 182 ride off the cams 190 during the inward movement of the motors 182 and side pincers 208. These toeward and inward movements are occasioned by the direction of pull of the front pincers 90, and the mounting of the side pincers 208 that permits their toeward and inward movements prevents the side pincers from fighting against the toe pincers during their vamp stretching movements. The result of the aforesaid pincers movements is a tight stretching of the vamp about the toe and forepart of the last with the topline 382 (FIGURES 35 and 35B) of the vamp stretched tightly on the last. During the movement of the pincers 90 and 208, the toe end portion of the vamp 332 is forced about the front retarder 122 (FIGURE 35) and forces the front retarder down to some extent against the yieldable force provided by the pressurized air in the cylinder 106, and the forepart portions of the vamp are forced about the side retarders 146 and force the side retarders down to some extent against the yieldable force provided by the pressurized air in the motors 138. The front retarder 122, by engaging the toe end of the last, prevents rearward or toeward movement of the shoe assembly during the stretching movement of the front pincers 90, and the side retarders 146, by engaging the sides of the last, prevent lateral movement of the shoe assembly during the stretching movement of the side pincers 208. Since the front pincers 90 and side pincers 208 are driven in their stretching movements by yieldable forces created by air under pressure, they terminate these movements when the stretching forces are equalized by the resistance to stretching of the upper. The portions of the stretched vamp margin between the front and side pincers are outspread into dog ears 384 (FIGURE 35A).

As stated above, when the shoe assembly was placed in the machine, the applicator-support 60 was resiliently urged above the level of the insole rests 40, 42 by the springs 334, this causing the insole 328 to be located above the insole rests. The downward pulling action of the pincers 90 and 208 causes the applicator-support to move downwardly against the forces of the springs 334 until the insole 328 comes into engagement with the insole rests 40, 42. At the end of the downward movement of the applicator-support, the insole is therefore supported at its margin by the applicator-support, which prevents the insole margin from drooping downwardly of the last, and is supported interiorly of its margin by the insole rests 40, 42.

Prior to the operation of the machine, the gauging mechanism 283 had been adjusted so that the projection of the gauge rod 326 described above causes its lower end to be positioned adjacent to but spaced from the last 330 and to point to that portion of the cone or centerline 386 of the top of the last that it is desired that the topline 382 of the vamp intersect after the pincers 90 and 208 have completed their downward stretching movements (see FIGURES 35 and 35B). This desired point of intersection of the cone 386 of the last and the topline 382 of the vamp will be dependent on the size and style of the shoe being made. These adjustments of the gauging mechanism 283 are performed by manipulating the knob 298 to move the gauge rod 326 horizontally, manipulating the bolt 308 to move the gauge rod in a substantially vertical direction, and by manipulating the bolt 316 to swing the gauge rod about the axis of the pin 312 through an arc that is substantially parallel to the curvature of the cone 386 of the last 330 in the region of the cone to be intersected by the topline 382 of the vamp 332. This arc is upwardly concave, that is, it appears concave when viewed from above.

At this time, if the topline is not in the proper position, as pointed out by the gauge rod 326, the operator may, through actuation of the valves 228, increase or diminish the downwardly directed pressure of each of the pincers 90 and 208 to thereby relocate the position of the vamp 332 on the last 330.

Referring to FIGURES 24–27 and 33, an actuation of a selected handle 232 to move its associated valve 228 from the FIGURE 25 to the FIGURE 26 position provides communication between the ports 264 and 266 and blocks the port 262. This causes the low pressure air flowing to the valve 228 from the line 364 to be blocked and enables air under full line pressure to flow from the line 339 through a line 388, the ports 264 and 266 of the valve 228 and one of the lines 390, 392, 394 to the motor 78 or 182 that is associated with the selected handle 232 to thereby force the associated pincers 90 or 208 downwardly under high pressure.

An actuation of a selected handle 232 to move its associated valve 228 to the FIGURE 27 position provides communication between the port 266 and the annular chamber 278 and blocks the ports 262 and 264. This causes the pressurized air in the motor 78 or 182 that is associated with the selected handle 232 to be vented to atmosphere through one of the lines 390, 392, 394 and the port 266 and chamber 278 of the valve 228 so that the pressure forcing the pincers 90 or 208 is released.

It can thus be seen that by manipulating the several handles 232 the downwardly directed pressures of the pincers 90 and 208 may individually be increased and released to thereby reposition the vamp on the last and thereby place the point of intersection of the topline 382 of the vamp 332 and the cone 386 of the last 330 in alignment with the gauge rod 326. After the upper has been repositioned to the operator's satisfaction, the valves 228 are returned to the FIGURE 25 position so that the pincers 90 and 208 are again forced downwardly under low pressure.

The operator now causes a valve 570 to be shifted while the valves 336 and 350 remain shifted. The shifting of the valve 570 enables pressurized air to pass from the line 339 through a line 572, the valve 570, a line 574 and a pilot line 576 to shift the valve 378 to closed position. The closure of the valve 378 enables the pressurized air in the line 380 to vent to atmosphere through the valve 378 and enables the relatively low pressure air in the line 372 to cause the motor 324 to raise the gauge rod 326.

The shifting of the valve 570 also enables pressurized air to pass through this valve and the line 574 to the motor 396 to actuate this motor to cause the piston rod 400, through the above described linkage shown in FIGURES 16–18, to move the slide plate 424 from its rearward out-of-the-way position to a forward working position. Prior to the shifting of the valve 570, the motor 396 had kept the slide plate 424 in its out-of-the-way position by pressurized air passing from the line 572 through the valve 570 and a line 578 to the motor 396, and, upon actuation of this motor, the air in it is exhausted to atmosphere through the line 578 and the valve 570. The pressurized air entering the line 574 in response to the shifting of the valve 570 had also passed through a pilot line 580 to the normally closed valve 437. Toward the end of the forward movement of the slide plate 424, the cam 435 opens the valve 437 to direct the pressurized air through the valve 437, a pilot line 582, a normally open valve 584 and a pilot line 586 to shift a valve 588. The shifting of the valve 588 causes pressurized air to pass from the line 339 through a line 590, the valve 588 and a line 592 to the motor 16 to actuate this motor to raise the post 20 and the parts carried thereby. Prior to the shifting of the valve 588, the motor 16 had been maintained in its idle position by pressurized air passing from the valve 588 through a line 594 to the motor 16.

In response to the shifting of the valve 570, through means that are shown in the aforementioned application Ser. No. 472,525 filed July 16, 1965, a quantity of molten cement is extruded through holes 596 and a groove 598 of the applicator-support 60 (FIGURES 4 and 35) against the bottom of the margin of the insole 328.

The shifting of the valve 570 also causes, by means shown in the aforementioned application Ser. No. 472,525 filed July 16, 1965, the admission of air under relatively low pressure to the motor 452 to actuate this motor under relatively low pressure to thereby force the hold-down 448 against the top of the forepart of the rising shoe under relatively low pressure.

To recapitulate, upon shifting of the valve 570, the gauge rod 326 is raised so as to be retracted into the motor 324 and the slide plate 424 is brought from its rearward out-of-the-way position to its forward working position, the timing being such that the gauge rod, which moves forwardly with the slide plate 424, is raised before it can intersect the shoe assembly and thereby damage the gauge rod and shoe assembly. The forward movement of the slide plate 424 brings the wipers 484, the yoke 496 and the bumpers 536 to a position where they can act on the shoe assembly as indicated in phantom in FIGURE 35. When the slide plate 424 has completed its forward movement, the post 20 is caused to rise to raise the applicator-support 60, the insole rests 40, 42, the pincers 90 and 208, and the retarders 122 and 146 to a level such that the bottom of the insole 328 is above the level of the tops of the wipers 484 an amount that is approximately equal to the thickness of the margin of the vamp 332. At about the beginning of the rise of the applicator-support 60, a quantity of cement is extruded onto the margin of the insole 328 to coat the insole with a ribbon of cement. Shortly after the shoe assembly has commenced its rise, the hold-down pad 450 of the hold-down 448 comes into engagement with the top of the forepart of the shoe assembly under relatively light pressure, as indicated in phantom in FIGURE 35, and rides upwardly with the shoe assembly under this relatively light pressure during the rise of the shoe assembly. It is desirable to keep the wipers 484, the yoke 496, the bumpers 536 and the hold-down 448 in an out-of-the-way position prior to the rise of the shoe assembly so that they will not interfere with the placement of the shoe assembly in the machine, the operation of the above described pulling over operation and the relocation by the manipulation of the handles 232 of the position of the vamp 332 on the last 330, and so that the operator will be able to see if the pulling over operation and the vamp relocation is being properly performed. The aforesaid raising of the gauge rod 326 also prevents the rising shoe assembly from intersecting the gauge rod and thereby damaging the gauge rod and shoe assembly.

The shoe assembly was initially so placed on the applicator-support 60 that when the yoke 496 was moved to its forward working position the edges of the last 330 overlapped the inner wall of the yoke. When the shoe assembly is forced upwardly by the motor 16, the inner yoke wall is initially compressed. When this wall can no longer be compressed, the bight 552 of the yoke flexes rearwardly against the pressure exerted by the spring 512 and the yoke legs 554 flex outwardly against the pressures exerted by the springs 556. After this, the support arms 560 and the spring arms 566 swing outwardly about the pins 568 and move the pins 544 outwardly in the slots 542 against the yieldable forces exerted by the springs 548 with the brackets 546 moving away from the mounts 538. The yieldable pressures exerted by the springs 512, 548 and 556 and the spring arms 566 causes the yoke 496 to snugly engage the vamp 332 and constrains the vamp to snugly conform to the shape of the last 330 during the rise of the shoe assembly. The bearing of the hold-down 448 against the top of the forepart of the shoe assembly under the aforementioned relatively light pressure during the rise of the shoe assembly prevents the shoe assembly from shifting with respect to the applicator-support 60 and insole rests 40, 42 during its upward movement into the yoke 496.

The parts are so constructed that the raising of the side retarder blades 146 during the rise of the post 20 causes the side retarders to press the dog ears 384 against the bottoms of the wipers 484 with the relatively light resilient force afforded by the motors 138, and the raising of the front retarder blade 122 during the rise of the post 20 causes the front retarder to press the portion of the vamp stretched by the front pincers 90 against the bottoms of the wipers 484 immediately to the rear of the vertex 488 of the wipers under the force exerted by the pressurized air in the cylinder 106. During the final increment of the rising movement of the toe post 20, after the retarders 122 and 146 have pressed the vamp margin against the wiper bottoms, the vamp is further stretched about the last, and, when the vamp can no longer be stretched, the pressed margin portions slip between the wiper bottoms and the retarders.

At or near the end of the rise of the toe post 20 and at or near the time that the front retarder 122 has forced the vamp margin against the wiper bottoms, the motors 94 are actuated to open the front pincers 90 to release the toe end portion of the vamp margin and the pincers 90 can now be moved downwardly and rearwardly to its lowermost position by the motor 78. This arrangement permits the front pincers to be lowered before it can interfere with the wipers and enables the front retarder 122 to engage the vamp margin without losing any of the stretch in the vamp that had been provided by the front pincers 90. At about the same time, motors 600 (FIGURE 15) are actuated to cause a heel clamping pad 602 (FIGURE 1) to bear against the heel of the shoe assembly. In addition, at this time, the motors 522 are actuated to move the cylinders 526 inwardly of the pistons 520 against the pressures of the springs 534 to thereby force the inner wall of the yoke 496 against the toe and forepart of the shoe assembly under higher pressure than had heretofore been exerted by the springs 548 and to force the bumpers 536 inwardly against the foreparts of the vamp in regions that are rearward of the yoke 496. Also, at this time, the motors 138 are caused to press the dog ears 384 against the bottoms of the wipers 484 under higher pressure than had heretofore been applied. After this the flow of pressurized air to the motors 202 is cut off and the air in these motors is exhausted to atmosphere to thereby enable the springs 604 (FIGURES 14 and 33) of these motors to lower the piston rods 226 so that the jaws of the side pincers 208 may open under the influence of the elastic bands 218 and thus release the forepart portions of the vamp margin that have been gripped by the pincers 208. After the pincers 208 release the vamp margin, they are lowered by further downward movement of the piston rods 200 of the motors 182.

At this time the parts assume the position shown in FIGURES 36 and 36A.

Now the motor 458 is actuated to move the wipers 484 in their wiping stroke. The actuation of the motor 458, through the housing 464, block 468 and links 482 causes the wiper cams 472 and the wipers 484 carried thereby to move with respect to the block 474 with the pins 476 riding in the cam tracks 478 and 480 in a path determined by the configuration of the cam tracks such that the wipers have both inward swinging movement about the vertex 488 and forward translatory movement. The wiper movement causes the wipers to engage the vamp margin while the vamp is stretched tightly about the last to wipe or fold the vamp margin against the insole 328 and bond the vamp margin to the insole by means of the ribbon of cement on the insole. During the wiper movement the knife 490 is projected forwardly of the vertex 488 to cut into the pleated vamp material gathered by the wipers 484 at the toe end of the shoe by the inward movement of the wipers to thereby relieve the stress in the vamp material created by this inward movement of the wipers.

As the wipers perform their wiping stroke, the motor 48 is actuated to cause the lowering of the applicator-support 60 out of the path of the wipers, the flow of pressurized air to the motors 138 is shut off so as to terminate the application of pressure by the side retarders 146 of the vamp margin against the wiper bottoms and the flow of pressurized air to the cylinder 106 is cut off so that the spring 116 can lower the retarder 122 away from the wiper bottoms. Also, during the wiping stroke, the normally open valve 584 (FIGURE 33) is closed to shut off the flow of pressurized air passing from the valve 584 through the pilot line 586 to the valve 588. This enables a conventional return spring in the valve 588 to shift this valve so as to cause pressurized air to pass from the line 590 through the valve 588 and the line 594 to the motor 16 to actuate this motor to lower the insole rests 40, 42 out of the path of the wipers. Towards the end of the wiping stroke air under full line pressure is admitted to the motor 452 to actuate this motor to force the hold-down 448 downwardly against the forepart of the shoe assembly under greater pressure than had heretofore been applied.

Thus, during the wiping stroke, the applicator-support 60 is first lowered out of the path of the oncoming wipers. After this, the pressures applied by the front retarder 122 and the side retarders 146 forcing the vamp margin against the wiper bottoms is relieved, the timing being such that this takes place after the wipers have crossed under the insole and have started to wipe the vamp margin against the insole. This is followed by the lowering of the insole rests 40, 42 out of the path of the oncoming wipers so that the shoe assembly is supported on its bottom solely by the wipers thus enabling the hold-down 448 to press the shoe assembly downwardly directly against the wipers and provide an overwiping pressure. Toward the end of the wiping stroke the hold-down is forced downwardly under relatively heavy pressure for a predetermined length of time to iron the now wiped vamp margin against the insole and to enable the cement that is between the wiped vamp margin and the insole to bond the upper margin to the insole. At the end of this predetermined length of time, the valve 336, 338, 350 and 570 are shifted to their original positions so that all of the machine parts can return to their idle conditions to complete the machine cycle.

We claim:

1. A lasting machine comprising: a support means for supporting bottom-down a shoe assembly that includes a last having an insole located on its bottom and an upper mounted thereon with the toe of the shoe assembly facing rearwardly and the heel of the shoe assembly facing forwardly; means for stretching the vamp of the upper about the forepart of the last preparatory to wiping the margin of the vamp against the insole; means for shifting the vamp on the last to the proper wiping position with the topline of the stretched vamp intersecting a predetermined portion of the cone of the last; a gauge, located above the support adapted to point to said cone portion; and means mounting the gauge to the machine for adjustment in three discrete paths, the first path extending in a forward and rearward direction that is adapted to lie lengthwise of the shoe assembly, the second path extending in a heightwise direction that is adapted to lie heightwise of the shoe assembly, and the third path extending upwardly and rearwardly in an upwardly concave arc that is adapted to lie substantially parallel to the curvature of the cone of the last.

2. The machine as defined in claim 1 wherein the gauge mounting means comprises: a slide block mounted to the machine rearwardly of the support means for forward and rearward movement to provide said first path of adjustment; and arm extending forwardly of the slide block; pivot means mounting the rear of the arm to the slide block for swinging movement in a heightwise plane to provide said second path of adjustment; a mount pivoted to the arm forwardly of the pivot means for swinging movement in a heightwise plane to provide said third path of adjustment; and means securing the gauge to the mount.

3. The machine as defined in claim 2 wherein the gauge comprises a rod that extends downwardly of the mount.

4. A lasting machine comprising: a support means for supporting bottom-down a shoe assembly that includes a last having an insole located on its bottom end an upper mounted thereon with the toe of the shoe assembly facing rearwardly and the heel of the shoe assembly facing forwardly; a slide plate, located rearwardly of the support means, mounted for movement from a rearward out-of-the-way position to a forward working position; wiping means mounted to the slide plate for movement through a wiping stroke from a retracted to an advanced position; a gauge rod mounted to the slide plate above the support means for heightwise movement between an upper portion and a lower position; means for initially maintaining the slide plate in its rearward position; means for initially maintaining the wiping means in its retracted position; means for stretching the vamp of the upper about the forepart of the last preparatory to wiping the margin of the vamp against the insole; means for placing the gauge rod in its lower position to point out a predetermined portion of the cone of the last that should be intersected by the topline of the stretched vamp; means for shifting the vamp on the last so that the topline of the stretched vamp will intersect said cone portion; means for thereafter moving the slide plate forwardly to its forward position; means, operative prior to the arrival of the slide plate in its forward position, to raise the gauge rod to its upper position so that it will not intersect the shoe assembly; and means for thereafter imparting a wiping stroke to the wiping means to cause the wiping means to wipe the margin of the vamp against the insole.

5. The machine as defined in claim 4 further comprising: a gauge motor connected to the gauge rod for effecting its heightwise movement; a slide plate motor connected to the slide plate for effecting its forward movement; and means for concomitantly causing the gauge motor to raise the gauge rod and the slide plate motor to effect forward movement of the slide plate.

6. The lasting machine as defined in claim 4 further comprising: means mounting the gauge rod to the slide plate for adjustment in three discrete paths, the first path extending in a forward and rearward direction that is adapted to lie lengthwise of the shoe assembly, the second path extending in a heightwise direction that is adapted to lie heightwise of the shoe assembly, and the third path extending upwardly and rearwardly in an upwardly concave arc that is adapted to lie substantially parallel to the curvature of the cone of the last.

7. The machine as defined in claim 6 wherein the gauge rod mounting means comprises: a slide block mounted to the slide plate for forward and rearward movement to provide said first path of adjustment; an arm extending forwardly of the slide block; pivot means mounting the rear of the arm to the slide block for swinging movement in a heightwise plane to provide said second path of adjustment; a mount pivoted to the arm forwardly of the pivot means for swinging movement in a heightwise plane to provide said third path of adjustment; and means securing the gauge rod to the mount.

8. A lasting machine comprising: a support means, mounted for heightwise movement, for supporting bottom-down a shoe assembly that includes a last having an insole located on its bottom and an upper mounted thereon with the toe of the shoe assembly facing rearwardly and the heel of the shoe assembly facing forwardly; wiping means located rearwardly of the support means and mounted for movement through a wiping stroke from a retracted to an advanced position; a gauge rod, located above the support means, mounted to the machine for heightwise movement between an upper position and a lower position; means for initially maintaining the support means in a lower position wherein the insole is below the top of the wiping means; means for initially maintaining the wiping means in its retracted position; means for stretching the vamp of the upper about the forepart of the last preparatory to wiping the margin of the vamp against the insole; means for placing the gauge rod in its lower position to point out a predetermined portion of the cone of the last that should be intersected by the topline of the stretched vamp; means for shifting the vamp on the last so that the topline of the stretched vamp will intersect said cone portion; means for thereafter raising the support means to bring the insole to a level that is at least as high as the level of the top of the wiping means; means for constraining the vamp to the shape of the last during the rise of the support means; means operative prior to the completion of the rise of the support means to raise the gauge rod to its upper position so that it will not intersect the shoe assembly; and means for thereafter imparting a wiping stroke to the wiping means to cause the wiping means to wipe the margin of the vamp against the insole.

9. The lasting machine as defined in claim 8 further comprising: means mounting the gauge rod to the machine for adjustment in three discrete paths, the first path extending in a forward and rearward direction that is adapted to lie lengthwise of the shoe assembly, the second path extending in a heightwise direction that is adapted to lie heightwise of the shoe assembly, and the third path extending upwardly and rearwardly in an upwardly concave arc that is adapted to lie substantially parallel to the curvature of the cone of the last.

10. The machine as defined in claim 9 wherein the gauge rod mounting means comprises: a slide block mounted to the machine for forward and rearward movement to provide said first path of adjustment; an arm extending forwardly of the slide block; pivot means mounting the rear of the arm to the slide block for swinging movement in a heightwise plane to provide said second path of adjustment; a mount pivoted to the arm forwardly of the pivot means for swinging movement in a heightwise plane to provide said third path of adjustment; and means securing the gauge rod to the mount.

11. A lasting machine comprising: a support means, mounted for heightwise movement, for supporting bottom-down a shoe assembly that includes a last having an insole located on its bottom and an upper mounted thereon with the toe of the shoe assembly facing rearwardly and the heel of the shoe assembly facing forwardly; a slide plate, located rearwardly of the support means, mounted for movement from a rearward out-of-the-way position to a forward working position; wiping means mounted to the slide plate for movement through a wiping stroke from a retracted to an advanced position; a gauge rod mounted to the slide plate above the support means for heightwise movement between an upper position and a lower position; means for initially maintaining the support means in a lower position wherein the insole is below the level of the top of the wiping means; means for initially maintaining the slide plate in its rearward position; means for initially maintaining the wiping means in its retracted position; means for stretching the vamp of the upper about the forepart of the last preparatory to wiping the margin of the vamp against the insole; means for placing the gauge rod in its lower position to point out a predetermined portion of the cone of the last that should be intersected by the topline of the stretched vamp; means for shifting the vamp on the last so that the topline of the stretched vamp will intersect said cone portion; means for thereafter moving the slide plate forwardly to its forward position; means, operative prior to the arrival of the slide plate in its forward position, to raise the gauge rod to its upper position so that it will not intersect the shoe assembly; means for thereafter raising the support means to bring the insole to a level that is at least as high as the level of the top of the wiping means; means for constraining the vamp to the shape of the last during the rise of the support means; and means for thereafter imparting a wiping stroke to the wiping means to cause the wiping means to wipe the margin of the vamp against the insole.

12. The machine as defined in claim 11 further comprising: a gauge motor connected to the gauge rod for effecting its heightwise movement; a slide plate motor connected to the slide plate for effecting its forward movement; and means for concomitantly causing the gauge motor to raise the gauge rod and the slide plate motor to effect forward movement of the slide plate.

13. The lasting machine as defined in claim 11 further comprising: means mounting the gauge rod to the slide plate for adjustment in three discrete paths, the first path extending in a forward and rearward direction that is adapted to lie lengthwise of the shoe assembly, the second path extending in a heightwise direction that is adapted to lie heightwise of the shoe assembly, and the third path extending upwardly and rearwardly in an upwardly concave arc that is adapted to lie substantially parallel to the curvature of the cone of the last.

14. The machine as defined in claim 13 wherein the gauge rod mounting means comprises: a slide block mounted to the slide plate for forward and rearward movement to provide said first path of adjustment; an arm extending forwardly of the slide block; pivot means mounting the rear of the arm to the slide block for swinging movement in a heightwise plane to provide said second path of adjustment; a mount pivoted to the arm forwardly of the pivot means for swinging movement in a heightwise plane to provide said third path of adjustment; and means securing the gauge rod to the mount.

References Cited

UNITED STATES PATENTS 2,778,040   1/1957   Willmott.
2,819,477   1/1958   Meyer _____ 12—12.4

PATRICK D. LAWSON, *Primary Examiner.*